United States Patent [19]
Endo et al.

[11] Patent Number: 5,765,671
[45] Date of Patent: Jun. 16, 1998

[54] ELECTRIC POWER UNIT AND POWER TRANSMITTING UNIT FOR ELECTRIC VEHICLES

[75] Inventors: Ken-ichi Endo; Issei Yamakoshi, both of Suwa; Masao Ono; Tamotsu Fukazawa, both of Yokohama, all of Japan

[73] Assignee: Seiko Epson Corporation, Tokyo, Japan

[21] Appl. No.: 524,681

[22] Filed: Sep. 7, 1995

[30] Foreign Application Priority Data

Sep. 7, 1994 [JP] Japan .................................. 6-213523

[51] Int. Cl.⁶ .......................... F16D 27/108; F16D 11/14; F16D 27/01; B60L 11/00
[52] U.S. Cl. .................... 192/48.2; 74/365; 74/370; 192/69.82; 192/84.2; 192/84.31; 192/84.92
[58] Field of Search .................. 192/69.82, 84.2, 192/84.31, 84.92, 48.2; 335/230, 234; 477/13, 20; 74/664, 370, 365

[56] References Cited

U.S. PATENT DOCUMENTS

| Re. 34,870 | 3/1995 | Cummins et al. | 335/234 X |
|---|---|---|---|
| 1,887,560 | 11/1932 | Matthews | 74/370 |
| 1,970,385 | 8/1934 | Maybach | 74/370 |
| 2,251,523 | 8/1941 | Patterson | 74/370 X |
| 2,375,952 | 5/1945 | Sinclair | 192/69.82 X |
| 2,514,385 | 7/1950 | Garbarini et al. | 74/370 X |
| 2,602,898 | 7/1952 | Inghram et al. | 74/370 X |
| 2,611,886 | 9/1952 | Kamper | 477/13 X |
| 2,969,134 | 1/1961 | Wiedmann et al. | 192/84.92 |
| 3,728,654 | 4/1973 | Tada | 335/234 |
| 4,490,815 | 12/1984 | Umehara et al. | 335/234 X |
| 4,494,098 | 1/1985 | Haneda et al. | 335/234 X |
| 4,829,947 | 5/1989 | Lequesne | 335/234 X |

FOREIGN PATENT DOCUMENTS

| 0 539 269 | 4/1993 | European Pat. Off. |
| 2058729 | 6/1972 | Germany. |
| A-3243431 | 5/1984 | Germany. |
| 4126311 | 2/1993 | Germany. |
| U-9312071 | 12/1993 | Germany. |
| 59-106727 | 6/1984 | Japan. |
| 675935 | 11/1990 | Switzerland. |
| WO 91/15377 | 10/1991 | WIPO. |

*Primary Examiner*—Rodney H. Bonck
*Attorney, Agent, or Firm*—Mark P. Watson

[57] ABSTRACT

An electric power apparatus and a power transmitting apparatus of an electric vehicle are each constructed as a unit structure to improve the overall range and reliability of the electric vehicle. In the electric vehicle including, as a power system, a battery power supply, a motor, and a controller for controlling rotation of the motor, an electric power unit comprises a plurality of storage cells making up the battery power supply, a case housing the storage cells, a motor driving circuit and a charger both mounted on the case, a plate substrate covering the storage cells, and sockets for connecting respective terminals of the storage cells, the motor driving circuit and the charger. Also, in the electric vehicle including, as a driving system, a motor, a clutch, a transmission, and a power transmitting mechanism, a power transmitting unit comprises an automatic multiple-speed clutch transmission including a dog clutch, and the dog clutch comprises a clutch movable portion including a permanent magnet, and a clutch driving portion including excitation coils.

2 Claims, 9 Drawing Sheets

ELECTRIC POWER UNIT AND POWER TRANSMITTING UNIT FOR ELECTRIC VEHICLES

BACKGROUND OF THE INVENTION

1. Field of the Invention

The present invention relates to the unit structure of an electric power apparatus and a power transmitting apparatus for use in electric vehicles, such as electric automobiles. More particularly, the present invention relates to an electric power apparatus which can easily be replaced and assembled, and a power transmitting apparatus which has improved efficiency of power transmission and is automated in control, for achieving an improvement in overall traveling performance.

2. Description of the Related Art

Recently, attention has been focused on electric vehicles powered by the use of electric motors for traveling as next-generation vehicles to be substituted for automobiles using internal combustion engines. In other words, it is expected that electric vehicles can solve a great part of environmental problems such as exhaust gas and noise of automobiles, the exhaust gas being said to be responsible for air pollution in percentage of about 70%. An additional benefit of the use of electric vehicles is extending the life of petroleum resources by a magnitude of two.

The electric vehicle includes as a power driving system, a battery power supply, an electric motor for supplying propulsion power and a motor driving circuit for controlling rotation of the motor. In such an electric vehicle, the motor power generated by the motor is transmitted through a power transmitting apparatus to rotatively drive a road wheel for propelling the vehicle.

Figure 14A:
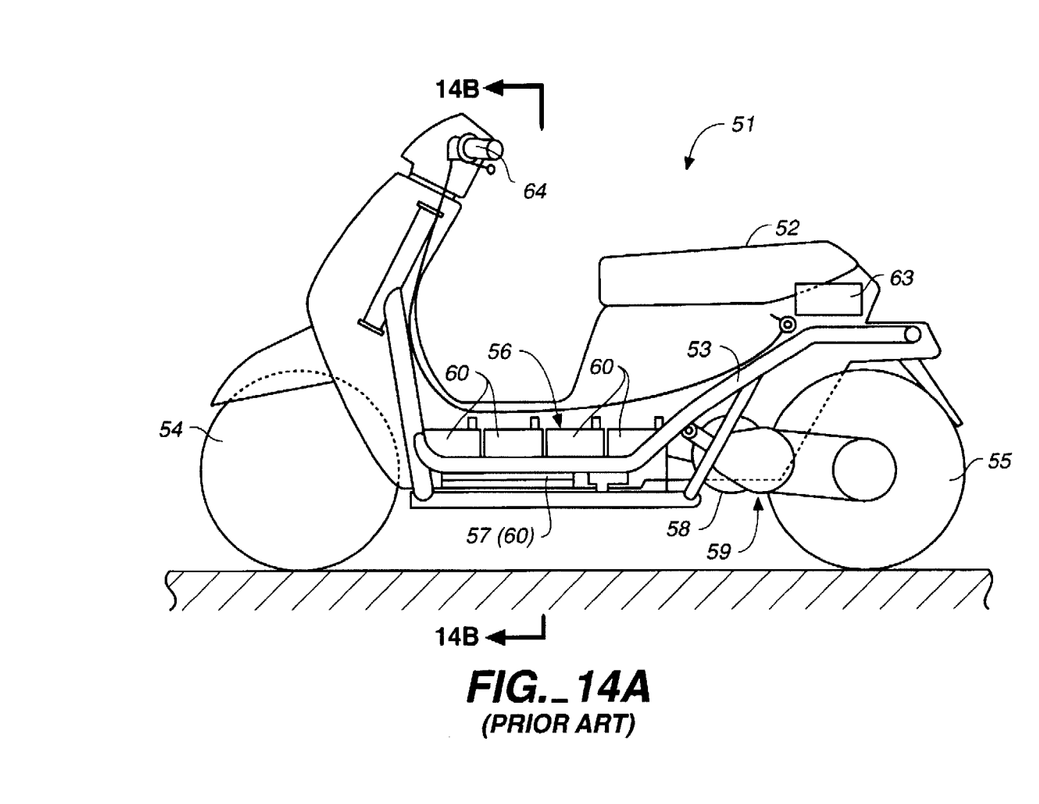
FIGS. 14A and 14B are side views schematically showing an electric scooter as one example of prior art electric vehicles.
Figure 14B:
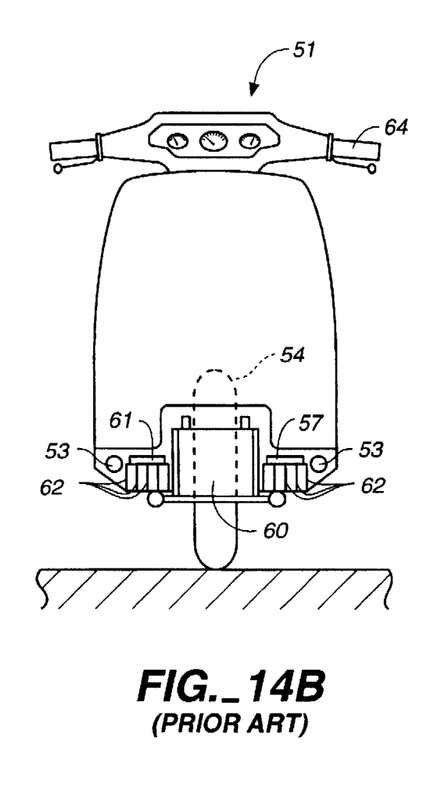

A description will be made below of, for example, an electric scooter as one type of electric vehicle. As shown in FIGS. 14A and 14B, an electric scooter 51 comprises road wheels 54, 55 suspended from a main frame 53 of a vehicle body 52 through shock absorbers (not shown), an electric power system comprises a battery power supply 56 disposed substantially centrally of vehicle body 52 in a low-level position, a motor driving circuit 57 for supplying electric power from battery power supply 56 to the motor while controlling the power in accordance with manual instructions from a driver, an electric motor 58 for supplying rotational energy to wheel 55 and controlled by motor driving circuit 57, and a power transmitting apparatus 59 for transmitting the rotational energy generated by motor 58 to a road wheel 55.

Battery power supply 56 constituting the electric power system is made up by, for example, four storage cells 60, 60 . . . fixedly secured to a frame through a bracket. These storage cells 60 are connected in series by large-diameter cables to produce a predetermined value of voltage while preventing power loss. On both sides of battery power supply 56, there are respectively disposed motor driving circuit 57 and a charger 61 which are fixed to vehicle body 52 through brackets and are electrically connected to input/output terminals of battery power supply 56 by cables. Further, heat radiation from motor driving circuit 57 and charger 61 is accelerated by heat radiating plates 62 provided on respective portions of vehicle body 52 located thereunder so that they can maintain normal operation. Thus, battery power supply 56, motor driving circuit 57 and charger 61 are fixedly mounted to the vehicle body 52 through respective brackets in separate relation and are electrically interconnected via a cable assembly.

Incidentally, denoted by 63 is a control circuit for controlling a rotational speed of motor 58, control circuit 63 being electrically connected to motor driving circuit 57 and an accelerator grip on a steering handle 64 by cables so that a control signal depending on operation of the accelerator grip by the driver is output to motor driving circuit 57.

Motor driving circuit 57 connected to battery power supply 56 supplies a preset amount of electric power to electric motor 58, whereupon electric motor 58 is operated at a predetermined rotational speed and driving forces produced by the motor are transmitted to rear wheel 55 through power transmitting apparatus 59. As power transmitting apparatus 59, there is generally known a multiple-speed clutch transmission using a plurality of gear mechanisms disposed in parallel, or a continuously variable transmission using a friction transmitting belt.

The multistage transmission is of the structure that a plurality of gear mechanisms comprising gear trains with different gear ratios from each other are provided, and the motor drive side is coupled to one of the gear mechanisms selected by the driver through mechanical meshing realized by a make- and-break clutch. Specifically, opposed rotating clutch plates are attached to an output shaft of the motor and an input shaft of each of the gear mechanisms, respectively, and are mechanically moved into contact with or away from each other to apply or cut off the driving forces of the motor. The gear trains with different gear ratios are thereby selectively driven to change the rotational speed transmitted. The above clutch operation is manually performed by the driver through a cam, a lever, a link mechanism, etc. based on judgment made by the driver in consideration of running situations.

The belt type continuously variable transmission (CVT) is an apparatus comprising a driver pulley provided on the motor side, a driven pulley provided on the rear wheel side, and a belt extending around both the pulleys, so that the driving forces of the motor are transmitted to the rear wheel side through friction forces produced between the belt and the pulleys. The belt is formed of a belt having a V-shaped cross-section which can produce greater friction forces than a flat belt by virtue of the wedging effect for increasing the transmission efficiency. The diameter of one of the pulleys is continuously increased or decreased to continuously change the ratio in radius of rotation between the pulleys, thereby varying the rotational speed input to the driver pulley.

However, the battery portion of the prior art electric vehicle has been disadvantageous in that because the separate storage cells are connected in series by cables, it takes time and troublesome to remove and connect the cables when the storage cells are assembled or replaced by new ones. In other words, harnesses for terminals of the storage cells must be removed one by one, and the corresponding relationship of the terminals and the harnesses is so laborious to discriminate that connection failures may sometimes cause. Further, because the battery portion, the motor driving circuit, and the charger are also interconnected by a cable assembly, this has raised a disadvantage that the operation is likewise complicated when those parts are assembled in manufacture or replaced by new ones in the case of partial failure of the equipment.

In environments under extremely low temperatures, such as encountered in the winter, electrochemical changes in the storage cells become less active and the charging/discharging ability of the storage cells is greatly reduced. This has accompanied a risk that the electric vehicle may fail to operate.

When the electric vehicle continues operating for an extended time, the motor driving circuit is heated during the continuous operation and the circuit function is lowered in spite of the design to accelerate heat radiation. This has also accompanied a drawback that the electric vehicle may fail to operate even if the storage cells are replaced by fully charged ones and no problems exist from the standpoint of power source.

Further, in the multistage transmission conventionally used as the power transmitting apparatus, because the clutch operation for speed change is generally effected by a foot (in four-wheeled vehicles) or a hand (in two-wheeled vehicles) upon judgment of the driver, it is rather difficult to make or break the clutch connection at the proper timing, resulting in a drawback that the clutch operation is sometimes out of the proper timing.

In the conventional belt type continuously variable transmission, because the driving forces are transmitted through friction transmission between the belt and the pulleys, there has accompanied a drawback that the transmission efficiency is low and the traveling ability of the electric vehicle cannot be improved. This drawback is presumably attributable to that utilization of friction forces produced between the belt and the pulleys for transmitting the driving forces therebetween necessarily causes a slippage during the transmission to such an extent that no appreciable problems occur in practical use.

OBJECTS OF THE INVENTION

Therefore, it is an object of the present invention to overcome the aforementioned problems.

It is another object of the present invention to provide an electric power unit which is constructed for housing a plurality of storage cells, a motor driving circuit and a charger in a case, and electrically connecting those components to each other by a plate substrate, and which can be assembled easily and replaced by a new one at one time.

It is an additional object of the present invention to provide a power transmitting unit which is constructed by using a motor for providing rotational energy and an automatic multiple-speed clutch transmission provided with a meshing clutch operable by electromagnetic forces, and which can increase the transmission efficiency and can be automatically operated in electrical interlock with the motor.

It is still another object of the present invention to improve the overall reliability and range of an electric vehicle by thus realizing the unit structure of each of the electric power unit and the power transmitting unit.

SUMMARY OF THE INVENTION

According to a first aspect of the present invention, an electric power unit for an electric vehicle includes, as a power system, a battery power supply, a motor and a controller for controlling rotation of the motor. The electric power unit more specifically comprises a plurality of storage cells constituting the battery power supply, a case housing the storage cells, a motor driving circuit and a charger both mounted on the case, a plate substrate covering the storage cells, and sockets for connecting respective terminals of the storage cells, the motor driving circuit and the charger.

According to a second aspect of the present invention, in the electric power unit for an electric vehicle the case includes heat radiating plates. Moreover, the motor driving circuit and the charger are mounted on the heat radiating plates, and sockets are provided on a lower surface of the plate substrate so that the sockets are connected to the respective terminals of the storage cells, motor drive circuit and charger when the plate substrate is fitted to the case.

According to a third aspect of the present invention, a power transmitting unit for an electric vehicle includes, as a driving system, a motor, a clutch, a transmission and a power transmitting mechanism. The power transmitting unit further comprises an automatic multiple-speed clutch transmission consisting of a dog clutch arranged to be rotatable with a motor output shaft and movable in the coaxial direction. Gear trains, including first and second transmission gears, which are supported respectively on both sides of the dog clutch to be loosely rotatable and are mechanically brought into contact with or away from the dog clutch. The dog clutch comprises a clutch movable portion provided to be movable in the axial direction of the motor output shaft and including a permanent magnet, and a clutch driving portion is disposed around the clutch movable portion and includes excitation coils.

According to a fourth aspect of the present invention, the clutch driving portion has, at both ends, yokes set to have a larger thickness than yokes at both ends of the clutch movable portion, thereby constituting a magnetic circuit to induce electromagnetic forces of which acting direction is reversed as the clutch movable portion is moved by excitation of the clutch driving portion.

In the third and fourth aspects of the present invention, preferably, the automatic is a multiple-speed clutch transmission and is housed in an enclosed case provided with heat radiating plates.

With the electric power unit of the first aspect of the present invention, the battery power supply comprising the plurality of storage cells, the charger, and the motor driving circuit are mounted in and on the case, and the connectors of those components are electrically coupled by the sockets to interconnect the components without using cables. Therefore, the drawbacks attributable to the cable connection can be solved totally. It is thus possible to prevent troubles caused by disconnection of the connecting cables and contact failures of the connectors. Also, since the storage cells can be interconnected in series or so in a predetermined way just by mounting the plate substrate in place, troublesome operation of attaching the connecting cables of the storage cells one by one is eliminated.

When normally replacing an expended battery, it is just required to replace the electric power unit by another fully charged electric power unit at a time. Accordingly, there is no need of detaching and attaching the connecting cables whenever each storage cell is unloaded and loaded.

Further, when replacing the battery after the electric vehicle has continued traveling, the motor driving circuit, which may fail to operate due to the heat generated by continuous operation, can also be replaced by a new one at the same time, enabling the electric vehicle to extend the travel distance of the vehicle.

When the electric power unit is thus replaced together, performance of the storage cells can be maintained at a satisfactory level and the cell life can drastically be prolonged by charging the exhausted electric power unit under strict temperature control. Specifically, when a storage cell is charged in a conventional manner, it cannot be charged at a desired constant temperature because the temperature of the storage cell itself is raised during the charging, or the temperature of open air is varied depending on the season. On the other hand, by charging the electric power unit of the present invention while it is entirely immersed in a constant-temperature water bath at 30° C., for example, the electric power unit can be charged while keeping it in a proper temperature condition. It is thus possible to prevent a reduction in reliability of the storage cells due to temperature variations, maintain performance of the storage cells at a satisfactory level, and hence prolong the cell life.

In accordance with the second aspect of the present invention, the case is fabricated of, e.g., a material having good thermal conductivity, the charger and the motor driving circuit are mounted on the case, and the heat radiating plates are provided near the mounted positions of those components, heat radiation is accelerated and a great heat radiating effect is provided.

Additionally, when the motor driving circuit and the charger are mounted in the vicinity of the battery power supply, the heat generated upon operation of the motor driving circuit or the charger can be conducted to the side of the storage cells through the case having high thermal conductivity in an environment under low temperatures such as encountered in the winter, enabling the storage cells of the battery power supply to be heated appropriately and kept at a proper temperature. Even in low-temperature environment, therefore, a deterioration in performance of the storage cells is prevented.

In accordance with the third aspect of the present invention, since the make- and break-operation of the clutch is electrically performed by utilizing electromagnetic forces, the clutch can be actuated in accordance with an electrical interlock with the motor to improve performance of the clutch operation. That is to say, when the clutch is actuated for the make- and break-operation, the torque and the rotational speed of the motor can be controlled to be temporarily changed into proper ones in response to a clutch switching signal.

In accordance with the fourth aspect of the present invention, when the clutch movable portion is positioned at the end of its movement stroke, attraction forces are exerted on the permanent magnet by cooperation of the permanent magnet of the clutch movable portion and the yoke of the clutch driving portion so as to act always in the direction of causing the clutch movable portion to move into mesh with a driver transmission gear. Therefore, when the clutch movable portion once reaches the stroke end, the clutch movable portion will not return to the neutral position and can be held in a pressed condition against the driver transmission gear even if the excitation coils of the clutch driving portion are not energized. Stated otherwise, since the direction in which electromagnetic forces are acting on the clutch movable portion is reversed before reaching the opposite ends of movement stroke of the clutch movable portion such that the forces pressing the clutch movable portion in the direction of movement under excitation continues acting even after the excitation coils are stopped from being energized, it is just required to energize the excitation coils of the clutch driving portion only at the beginning of movement of the clutch movable portion. As a result, the power consumed by the clutch operation can be reduced to a necessary minimum value. When breaking the connection of the clutch, i.e., when returning the clutch movable portion of the dog clutch to the neutral position, or when connecting it to the gear on the opposite side, a current is supplied to the excitation coils in the reversed direction. The clutch movable portion is thereby moved in a similar manner as mentioned above, but in the reversed direction.

In the third and fourth aspects of the present invention of this application, when the automatic multiple-speed clutch transmission is housed in the enclosed case provided with the heat radiating plates, the case can serve as a casing while ensuring efficient heat radiation, resulting in the simplified structure.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention will hereinafter be described in connection with first and second embodiments shown in FIGS. 1 to 10. Note that the embodiments will be described, taking, as an example, an electric motorcycle as one kind of electric vehicle. As will be appreciated by one of ordinary skill in the art, other types of electric vehicles may employ the present invention.

First Embodiment

Figure 1:
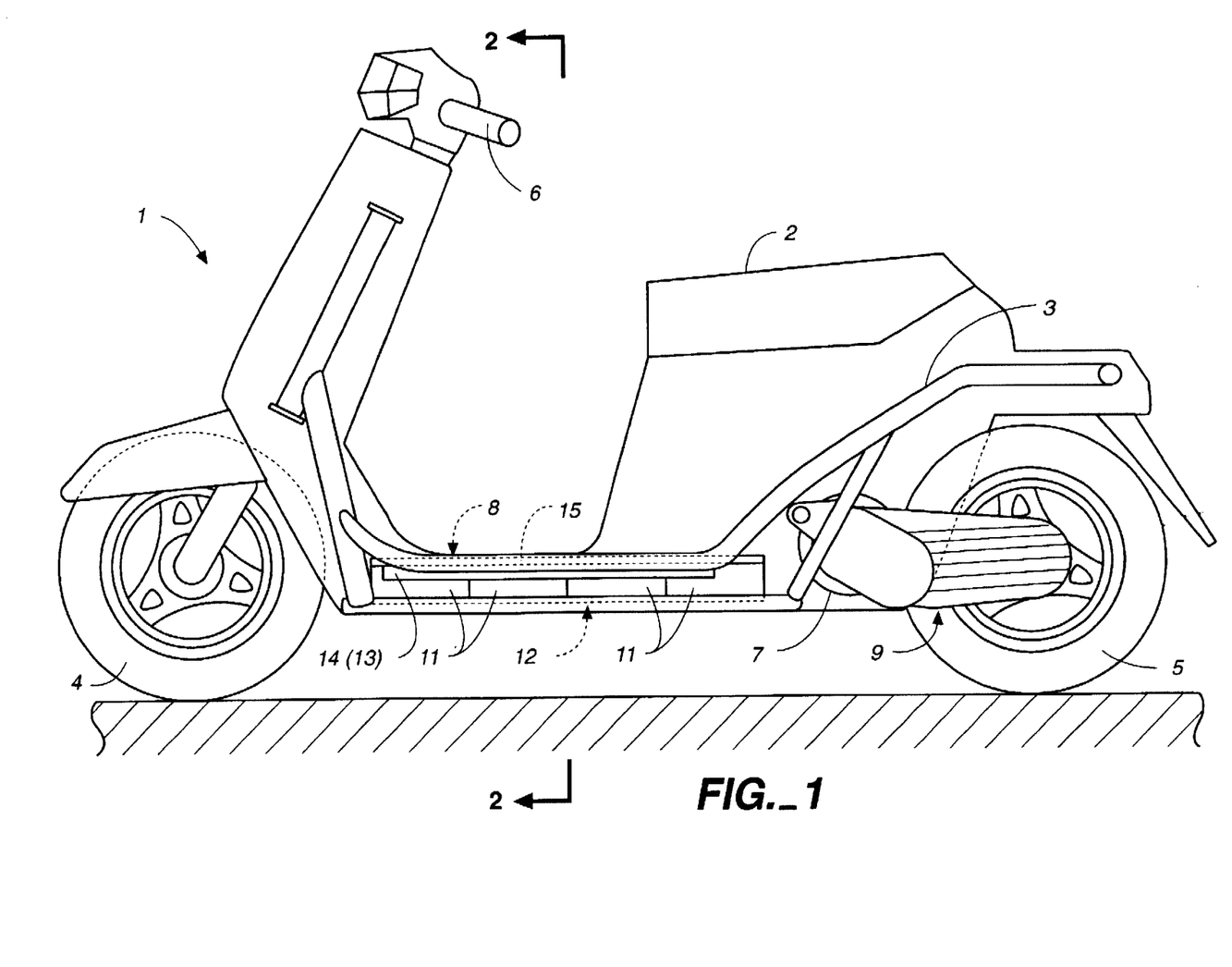
FIG. 1 is a side view schematically showing the construction of an electric motorcycle in accordance with the first embodiment of the present invention.

In FIG. 1, an electric motorcycle 1 includes road wheels 4, 5 positioned respectively in front and rear parts of a vehicle body 2 and suspended from a main frame 3 of the vehicle body, similar to a conventional motorcycle driven by an engine. The front wheel 4 is steered by a handle 6, and the rear wheel 5 is rotatively driven by not an engine, but an electric motor 7.

A main frame 3 has mounted thereon an electric power unit 8 for housing a power source, such as storage cells 11, for supplying electric power to electric motor 8. A power transmitting unit 9 transmits rotational energy from motor 7 to rear wheel 5. Other parts, such as an accelerator grip provided on the handle 6, brake levers, brake mechanisms and suspensions, some of them being not shown, are basically the same as those used in conventional motorcycles.

Figure 2:
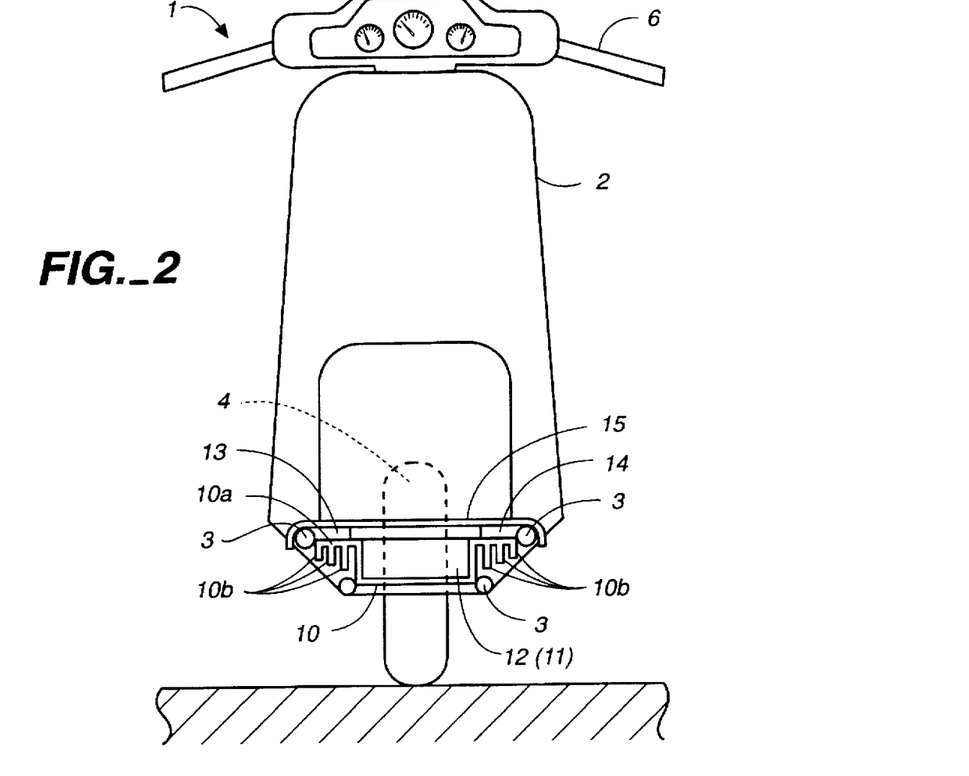
FIG. 2 is a cross-sectional view taken along line II—II in FIG. 1.
Figure 3:
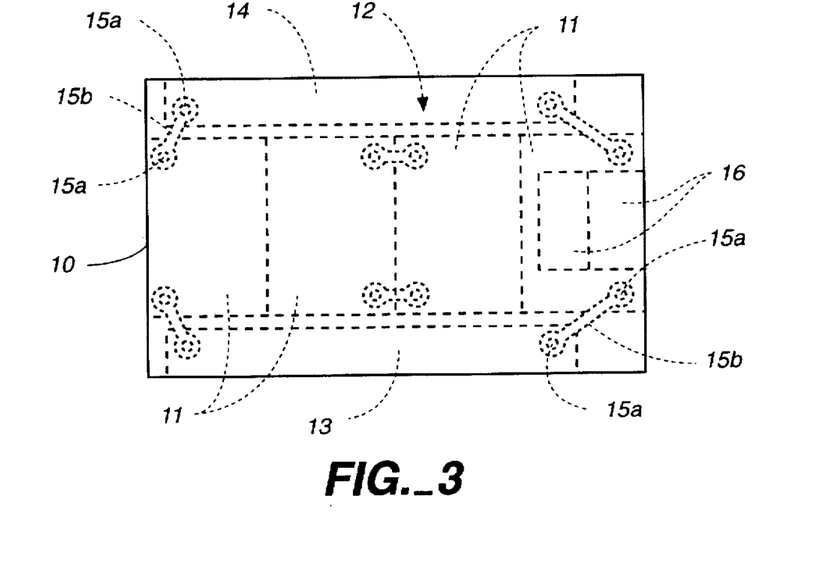
FIG. 3 is a plan view showing of the first embodiment of the electric power unit of FIG. 1.
Figure 4:
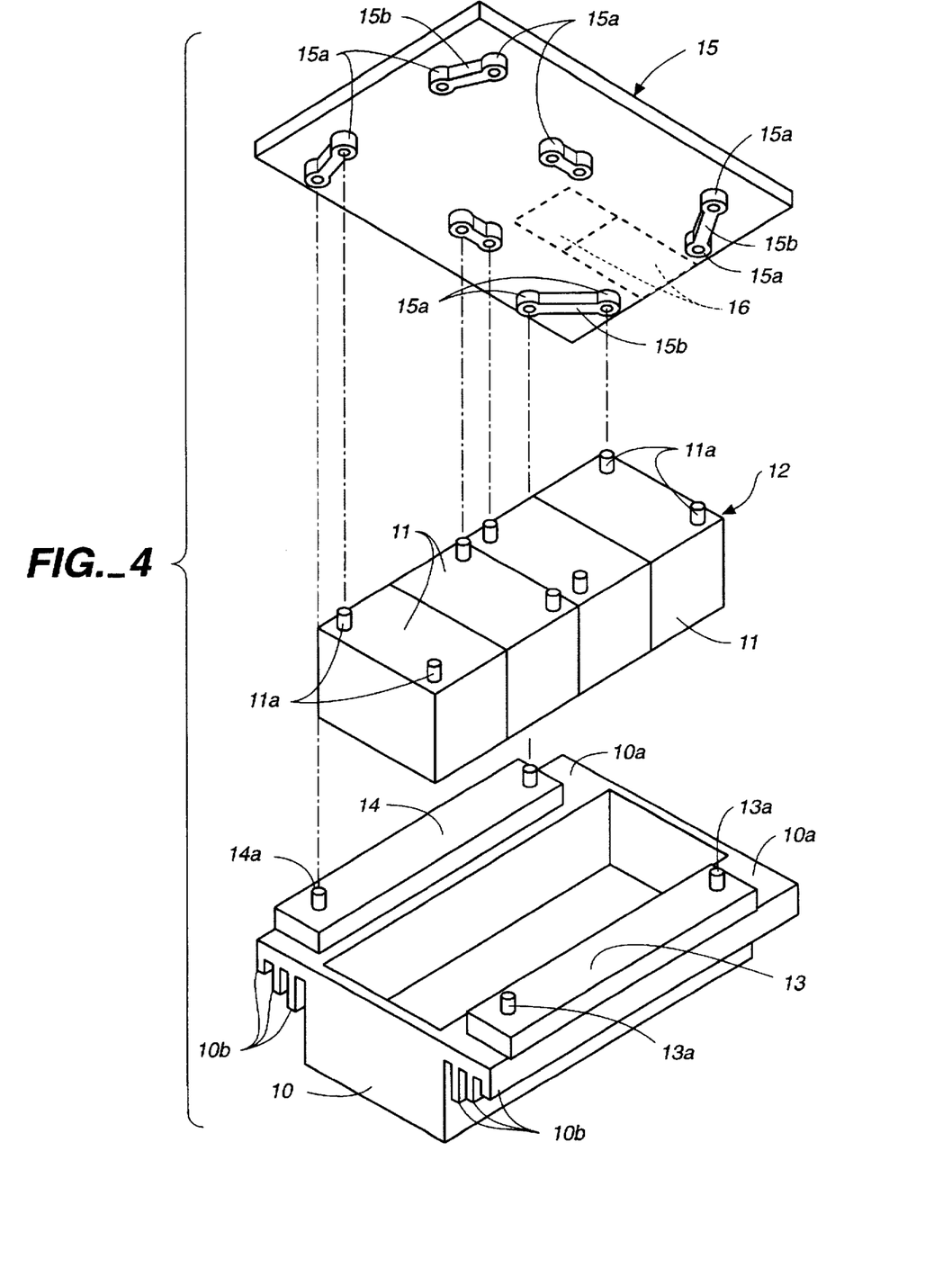
FIG. 4 is an exploded perspective view showing the embodiment of FIG. 1.

Electric power unit 8 comprises, as shown in FIGS. 2 to 4, a case 10 being open upwardly, a battery power supply 12 made up by a plurality of storage cells 11 housed in case 10, a charger 13 and a motor driving circuit 14 both disposed in the vicinity of battery power supply 12, and a plate substrate 15 for electrically connecting those components to each other and covering an entire upper surface of case 10. Electric power unit 8 is mounted in a low-level position substantially centrally of main frame 3 of vehicle body 2 in such a manner that it can be replaced by a new one at any time.

Case 10 of electric power unit 8 is preferably fabricated by a material having good thermal conductivity, such as an aluminum alloy, and is formed into the shape of a long box being open upwardly. Storage cells 11, making up battery power supply 12, are housed in the open space of case 10. Also, case 10 is arranged on both sides thereof with mount plates 10a which are each shaped in the form of a long flat plate and mount thereon charger 13 and the motor driving circuit 14, respectively. On a lower surface of each of mount plates 10a, a multiplicity of large-sized heat radiating plates (heat sinks) 10b are integrally provided to extend in the longitudinal direction of the vehicle body. Accordingly, heat generated with operation of charger 13 and motor driving circuit 14 mounted on the mount plates 10a is dissipated to air through the heat radiating plates so that the components can continue operating normally.

Referring to FIG. 4, charger 13, comprising a rectifying circuit, a transformer circuit and the like, is employed when charging the storage cells with the electric power unit 8 kept mounted in place. Connector terminals 13a are projected on an upper surface of charger 13. Since the amount of heat generated by the whole of charger 13 during the charging operation is considerably great, sufficient heat radiation is achieved through the large-sized heat radiating plates 10b provided on case 10. Furthermore, with charger 13 mounted near battery power supply 12 in case 10, the heat generated by charger 13 can be conducted to the side of storage cells 11 through case 10 having high thermal conductivity, enabling storage cells 11 of battery power supply 12 to be heated appropriately in an environment under low temperatures, such as encountered in the winter. Even in the low-temperature environment, therefore, since storage cells 11 are heated appropriately with the operating heat of charger 13, the storage cells can fully develop their charging/discharging ability and can be charged with a sufficient degree of capacity.

Still referring to FIG. 4, motor driving circuit 14 preferably comprises a MOSFET circuit, and has connector terminals 14a projected on its upper surface. Chopper control is made by switching operation of the FET circuit to control a rotational speed of the motor. Since the amount of heat generated by the whole of the circuit is considerably great due to the switching operation, case 10 is designed to achieve a sufficient degree of heat radiation through large-sized heat radiating plates 10b provided on case 10. In addition, with motor driving circuit 14 mounted near battery power supply 12, the heat generated by motor driving circuit 14 can be conducted to the side of storage cells 11 through case 10 having high thermal conductivity, enabling storage cells 11 of battery power supply 12 to be heated appropriately in an environment under low temperatures, such as encountered in the winter. Even in the low-temperature environment, therefore, since storage cells 11 are heated appropriately with the operating heat of motor driving circuit 14, the storage cells can fully develop their charging/discharging ability, allowing electric vehicles to travel in a wider range of environment.

As shown in FIG. 4, plate substrate 15 is formed of a flat base plate having a larger area than at least an upper surface of battery power supply 12. Plate substrate 15 serves to interconnect battery power supply 12, charger 13, and motor drive circuit 14 mounted to case 10 without using cables, and to mount various circuits 16 thereon. More specifically, on a lower surface of plate substrate 15, connector sockets 15a are provided in positions corresponding to connector terminals 11a, 12a, 13a of storage cells 11 of battery power supply 12, charger 13 and motor driving circuit 14 which are mounted in place. Then, sockets 15a are interconnected between selected conductor plates 15b, which are each in the form of a long bar and is fixedly secured to plate substrate 15 by an adhesive, such as caulk. Further, conductor plates 15b are made of copper and have a large thickness for preventing power loss between the components. Additionally, since connector sockets 15a and various circuits 16 are mounted on the lower surface of plate substrate 15, it is possible to sufficiently ensure safety against accidents of electric shock and to protect the various circuits.

In a gap space between sockets 15a of plate substrate 15 and conductor plates 15b, there can be mounted not only the principal control circuits, but also various additional circuits 16. By way of example, a monitor circuit for monitoring current and voltage conditions of each of storage cells 11, a voltage equalizing circuit for separately discharging the storage cells so as to have even voltages when variations in voltage of storage cells 11 are found as a result of the monitoring, circuits for driving and evaluating various sensors, etc. can also be mounted on plate substrate 15 together. Accordingly, a variety of circuits can easily be mounted and addition of such circuits can provide electric power unit 8 with additional intelligence to automatically control storage cells 4. Also, with the circuits mounted on a single base plate, it is possible to control the circuits in a concentrated manner, facilitate electrical maintenance, and dispense with unnecessary wiring between the circuits, which are otherwise required in the vehicle body, enabling the device construction to be simplified.

With the electric power unit of the first embodiment, as explained above, the battery power supply comprising a plurality of storage cells, the charger, and the motor driving circuit are mounted in and on the case, and the connectors of those components are coupled to the sockets provided on the plate substrate and wired by the conductor plates allowing a large current to flow therethrough, so that the components are connected to each other without using cables. Therefore, the drawbacks attributable to the cable connection can be solved totally. It is thus possible to prevent troubles caused by disconnection of the connecting cables and contact failures of the connectors. Also, since the storage cells can be interconnected in series or so in a predetermined way just by mounting the plate substrate in place, troublesome operation of attaching the connecting cables of the storage cells one by one is eliminated, the number of assembly steps can be reduced greatly, and the assembly is facilitated. By virtue of this arrangement, incorrect wiring and/or connections can be prevented, even when partly replacing the storage cells in ordinary use. The replacing operation is also likewise simplified.

When replacing an exhausted or discharged battery, it is just required to replace the electric power unit having a reduced battery capacity by another fully charged electric power unit at a time. Accordingly, there is no need of detaching and attaching the connecting cables whenever each storage cell is unloaded and loaded, enabling the replacing operation to be facilitated.

Further, when replacing the battery after the electric motorcycle or automobile, the motor driving circuit, which may fail to operate due to the heat generated by continuous operation, can also be replaced by new one under the normal temperature at the same time. This enables the electric vehicle to further continue traveling and ensures stable traveling over a long distance.

When the electric power unit is replaced together, the life of storage cells can drastically be prolonged by charging the exhausted electric power unit under strict temperature control. More specifically, when a storage cell is charged in a conventional manner, it cannot be charged at a desired constant temperature because the temperature of the storage cell itself is raised during the charging, or the temperature of open air is varied depending on the season. With such temperature variations in the charging, reliability of lead cells used as the storage cells has lowered, the service life thereof has shortened, and the economical efficiency has reduced. By charging the electric power unit while it is entirely immersed in a constant-temperature water bath at 30° C., for example, the electric power unit can be charged while keeping it in a proper temperature condition. It is thus possible to maintain performance of the storage cells at a satisfactory level and to prolong the cell life. As a result, the economical efficiency can be increased.

Further, since the case is fabricated by a material having good thermal conductivity, the charger and the motor driving circuit are mounted on the case, and the large-sized heat radiating plates are provided near the mounted positions of those components for accelerating heat radiation, a great heat radiating effect can be provided, limits in operating temperature of the charger and the motor driving circuit can be raised, and the operation performance thereof can be improved.

Additionally, since the motor driving circuit and the charger are mounted in the vicinity of the battery power supply, the heat generated upon operation of the motor driving circuit or the charger can be conducted to the side of the storage cells through the case having high thermal conductivity, enabling the storage cells of the battery power supply to be heated appropriately and kept at a proper temperature. Even in environment under low temperatures, therefore, a deterioration in performance of the storage cells is prevented. Consequently, the charging/discharging ability of the storage cells can be maintained and the traveling performance of electric vehicles can be improved.

Second Embodiment

Next, a power transmitting unit of the present invention will be described in connection with the second embodiment shown in FIGS. 5 to 10.

Figure 5:
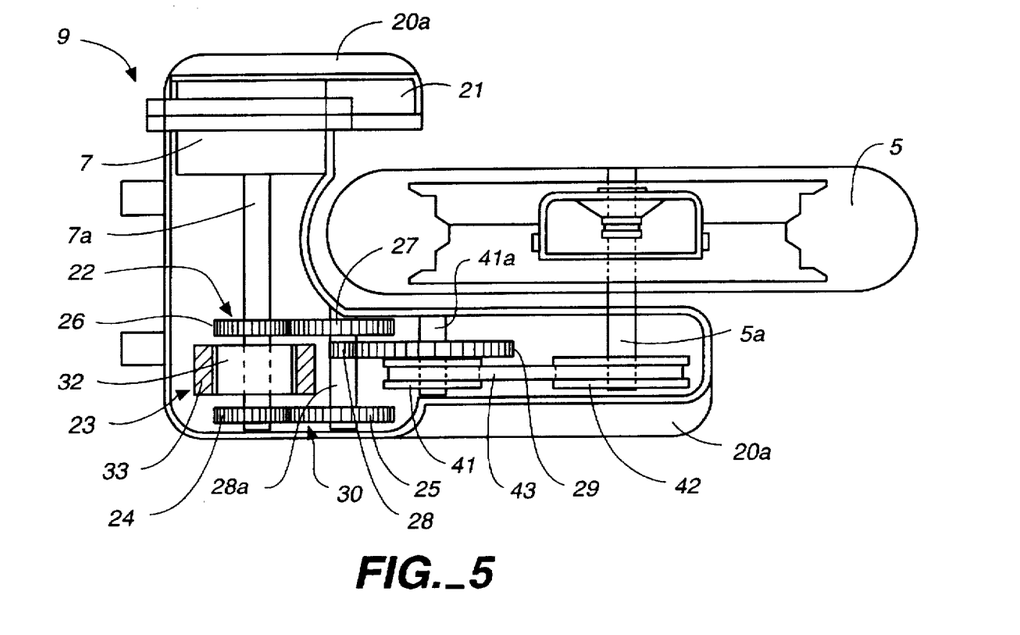
FIG. 5 is an overall horizontal cross-sectional view showing the embodiment of FIG. 1.

Referring to FIG. 5, power transmitting unit 9 of the second embodiment is disposed in an enclosed case 20 together, and comprises a motor driving circuit 21, an electric motor 7 for providing rotational energy and an automatic multiple-speed clutch transmission 22 for converting the rotational driving forces generated by motor 7 into proper torque at a rotational speed and transmitting it to rear wheel 5. The power transmitting unit 9 is preferably attached to the body frame 3 through shock absorbers (not shown).

Figure 6:
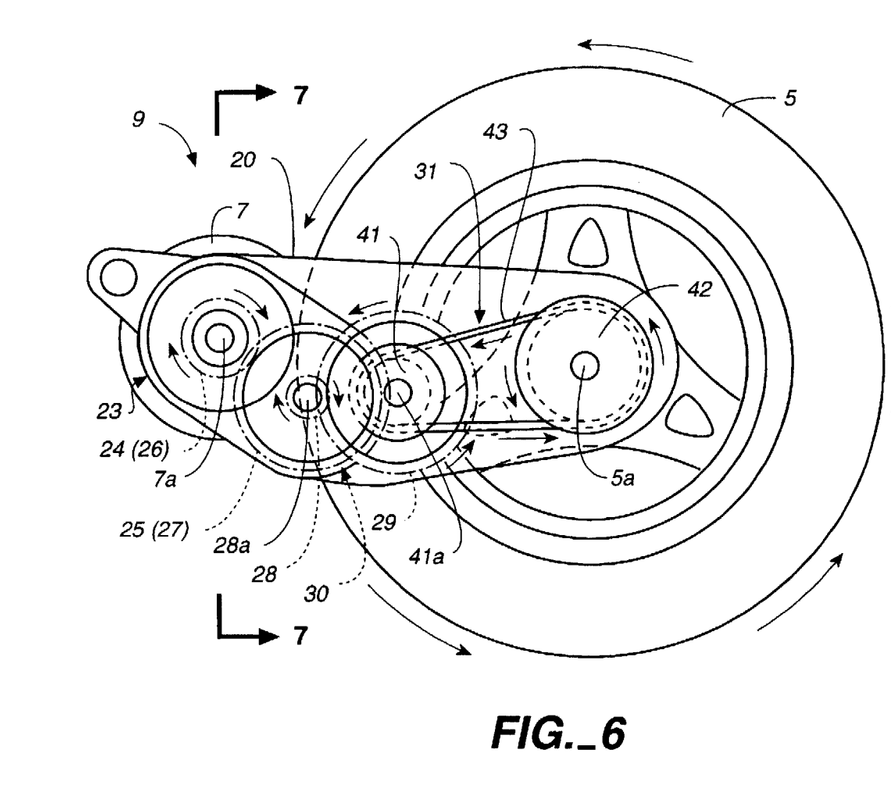
FIG. 6 is an overall side view showing of the second embodiment of the present invention.
Figure 7:
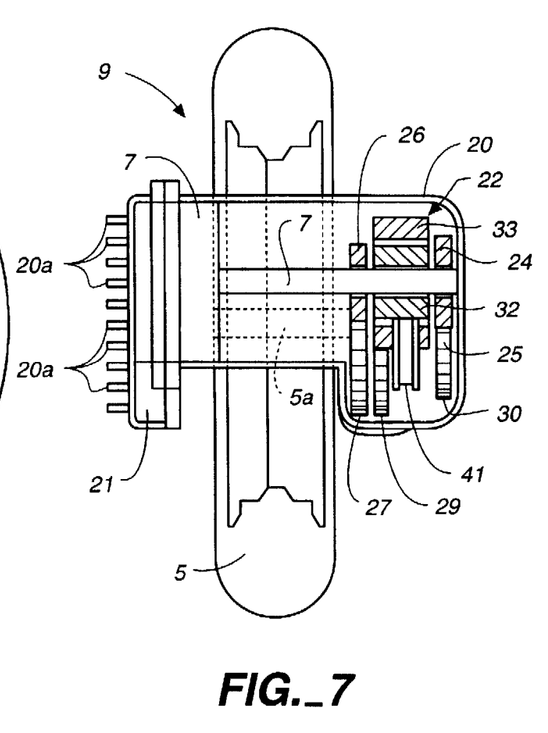
FIG. 7 is a cross-sectional view taken along line VII—VII in FIG. 6.

More specifically, in FIGS. 5 to 7, electric motor 7 for powering the electric vehicle, which is housed in a casing structure cast from an aluminum alloy, is fixedly secured in enclosed case 20 at one end side, and rear wheel 5 is fixedly secured to an axle supported by enclosed case 20 at the other end side through a bearing. Then, between output shaft 7a of motor 7 and rear wheel axle 5a, automatic multiple-speed clutch transmission 22 is disposed and housed in enclosed case 20. Thus, the rotational energy or power generated by motor 7 is transmitted to rear wheel 5 through automatic multiple-speed clutch transmission 22, whereupon rear wheel 5 is rotatively driven to propel the electric motorcycle for traveling.

Enclosed case 20 is preferably fabricated by an aluminum alloy which is a light-weight material having good thermal conductivity. On an outer surface of enclosed case 20, near the positions where electric motor 7 and automatic multiple-speed clutch transmission 22 are mounted, a multiplicity of large-sized heat radiating plates (heat sinks) 20a are integrally provided to extend in the longitudinal direction of the vehicle body. Accordingly, while the motorcycle is traveling, a large amount of heat generated by the operation of electric motor 7 is efficiently dissipated to a large amount of air passing large-sized heat radiating plates 20a. As a result of this heat dissipation, motor 7 can continue operating stably.

Further, motor driving circuit 21 for controlling the rotational speed of electric motor 7 is disposed near large-sized heat radiating plates 20a for sharing them so as to provide sufficient heat radiation therefrom. Although motor driving circuit 21 is disposed in case 20 on the same side as motor 7 in the illustrated embodiment, it may be disposed in case 20 at a position near automatic multiple-speed clutch transmission 22 where the heat radiating effect is greater.

Electric motor 7 is preferably comprised by a large-power DC motor being superior in durability and reliability, and is horizontally mounted in enclosed case 20. Output power of electric motor 7 is transmitted to or cut off from rear wheel 5 by a later-described dog clutch 23 of automatic multiple-speed clutch transmission 22.

Automatic multiple-speed clutch transmission 22 comprises a dog clutch 23 fitted over motor output shaft 7a to be rotatable therewith and movable in the axial direction, and gear train 30, including first and second driver transmission gears 24, 26, which are supported respectively on both sides of dog clutch 23 to be loosely rotatable in coaxial relation and are mechanically brought into contact with or away from dog clutch 23. First and second driver transmission gears 24, 26 of gear train 30 and driven transmission gears 25, 27 in mesh with driver transmission gears 24, 26, respectively, are selected to have predetermined gear ratios for rotation at predetermined reduced speeds. Driven transmission gears 25, 27 are connected to the same intermediate driver shaft 28a to drive intermediate driver gear 28 fitted over intermediate driver shaft 28a. Intermediate driven gear 29 in mesh with intermediate driver gear 28 to be driven thereby drives toothed transmission device 31 for driving rear wheel axle 5a. Dog clutch 23 is mechanically brought into contact with or away from one of the drive transmission gears 24, 26 selected by electromagnetic forces, thereby transmitting or cutting off the motor output power to or from it. Thus, the power produced by electric motor 7 is converted into proper torque at a proper rotational speed by a mechanical speed reduction mechanism, and the resulted driving forces are efficiently transmitted to rear wheel axle 5a through toothed belt transmission device 31 for rotatively driving rear wheel 5.

Figure 8:
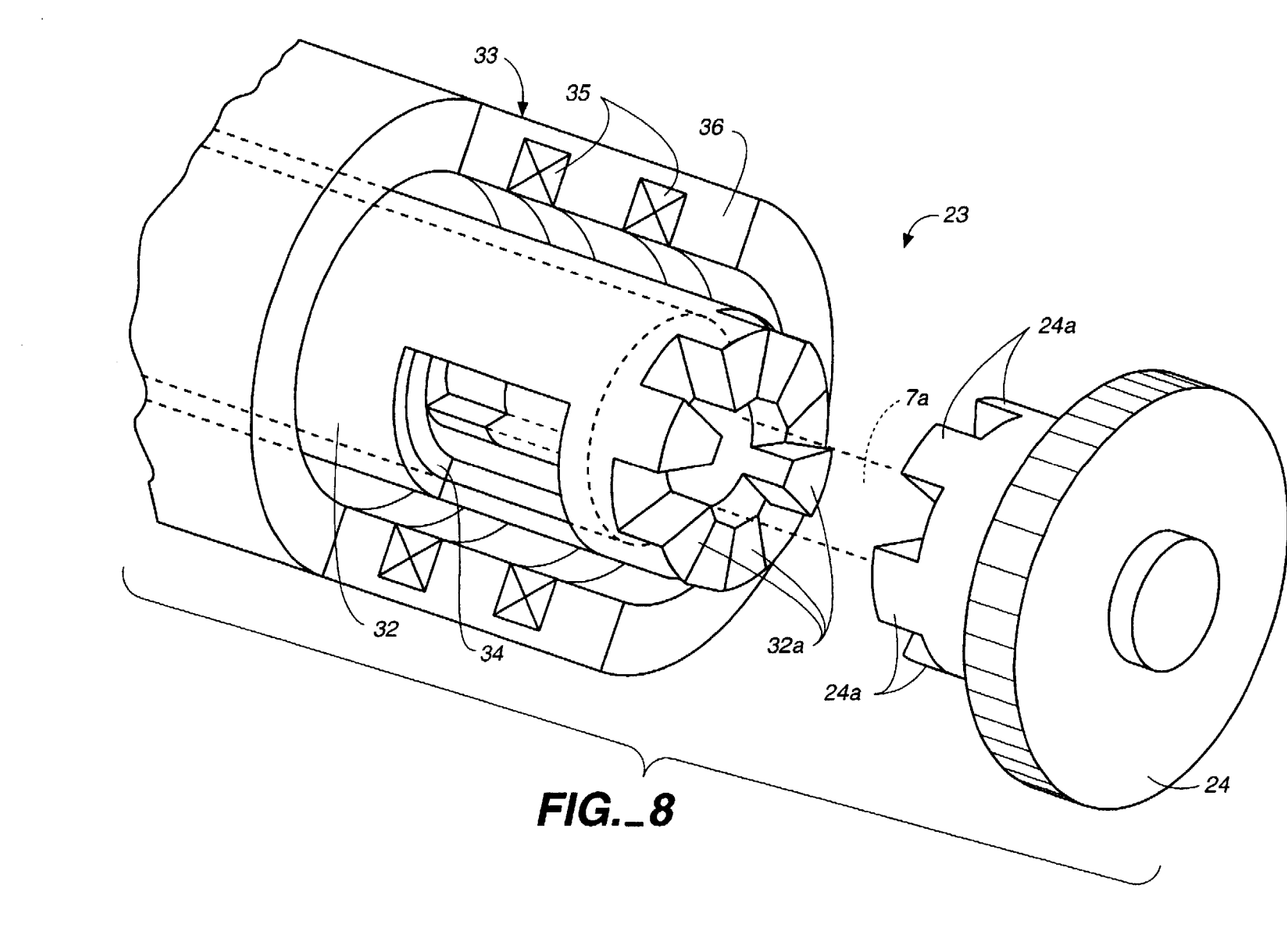
FIG. 8 is a perspective view schematically showing the construction of a dog clutch in an automatic multiple-speed clutch transmission in accordance with the second embodiment.

More specifically, as shown in FIG. 8, dog clutch 23 comprises clutch movable portion 32 coupled to motor output shaft 7a through splines to be movable in the axial direction thereof, and cylindrical clutch driving portion 33 disposed around clutch movable portion 32. Thus, the rotative power of motor 7 is transmitted to clutch movable portion 32 for rotatively driving clutch movable portion 32, and clutch movable portion 32 is movable in the axial direction of motor output shaft 7a. Then, clutch movable portion 32 is moved toward one of first and second driver transmission gears 24, 26 selected by electromagnetic forces from clutch driving portion 33 for establishing mechanical contact therebetween. Selected first driver transmission gear 24 or second driver transmission gear 26 is thereby rotatively driven to achieve clutch operation for transmission or cutoff of the power. Also, since the dog clutch 23 is operated by electromagnetic forces, it can be operated in electrical interlock with electric motor 7 for traveling.

Dog clutch 23 is a type of meshing clutches, namely, a jaw-type clutch. Clutch movable portion 32 has rectangular projections 32a, 32a formed on each of its side surfaces intermittently along a circumference about motor output shaft 7a, and rectangular projections 24a, 26a are likewise intermittently formed on respective side surfaces of first and second driver transmission gears 24, 26 opposing to the side surfaces of clutch movable portion 32. Therefore, when clutch movable portion 32 is moved toward first or second driver transmission gear 24, 26, projections 32a and 24a or 26a and recesses defined therebetween are brought into mesh with each other so that motor output shaft 7a and first or second driver transmission gear 24, 26 are mechanically coupled through clutch movable portion 32.

While the rectangular projections are provided on the same circumference in each of both the side surfaces of clutch movable portion 32 and the corresponding opposed side surfaces of first and second driver transmission gears 24, 26 in this embodiment, the present invention is not limited to the illustrated arrangements. By way of example, projections and recesses may be in the form of trapezoids or spirals for mutual meshing to achieve mechanical coupling. Further, rather than arranging the projections along a circumference, a number of conical projections and recesses may be provided at random in each of the opposed side surfaces for mutual meshing.

Figure 9:
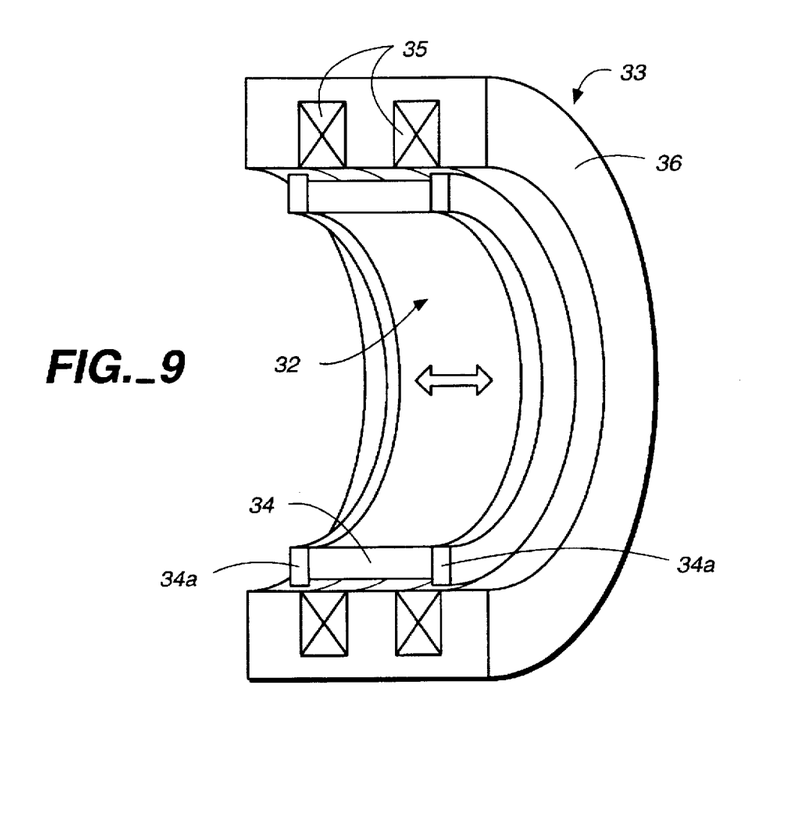
FIG. 9 is a perspective view showing a clutch movable portion and a clutch driving portion of the dog clutch in accordance with the second embodiment.

In dog clutch 23, clutch movable portion 32 includes permanent magnet 34 and clutch driving portion 33 includes excitation coils 35.

More specifically, as shown in FIG. 9, clutch movable portion 32 incorporates a cylindrical permanent magnet 34 provided with yokes 34a, 34a at both its ends, permanent magnet 34 having opposite end portions fixedly magnetized to N, S poles, respectively. By energizing clutch driving portion 33 to act electromagnetic forces on permanent magnet 34, clutch movable portion 32 is moved in the desired axial direction to perform the make- and-break operation of the clutch.

Clutch driving portion 33 is in the cylindrical form having a larger outer diameter than clutch movable portion 32, and comprises yoke 36 made of a ferromagnetic body and having a substantially E-shape in cross-section, and excitation coils 35 disposed in respective gap spaces of E-shaped yoke 36.

Figure 10:
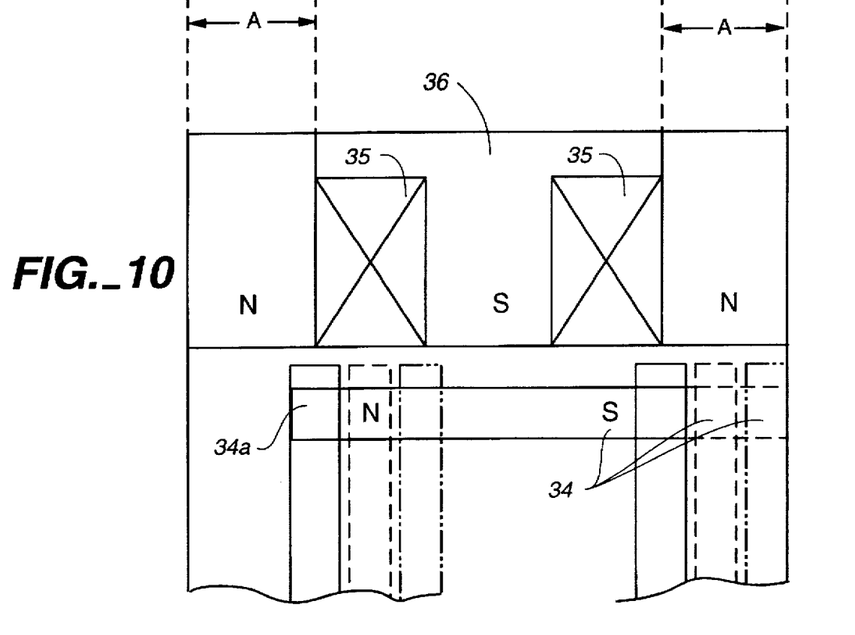
FIG. 10 is a cross-sectional view showing the clutch movable portion and the clutch driving portion of the dog clutch in accordance with the second embodiment.
Figure 11:
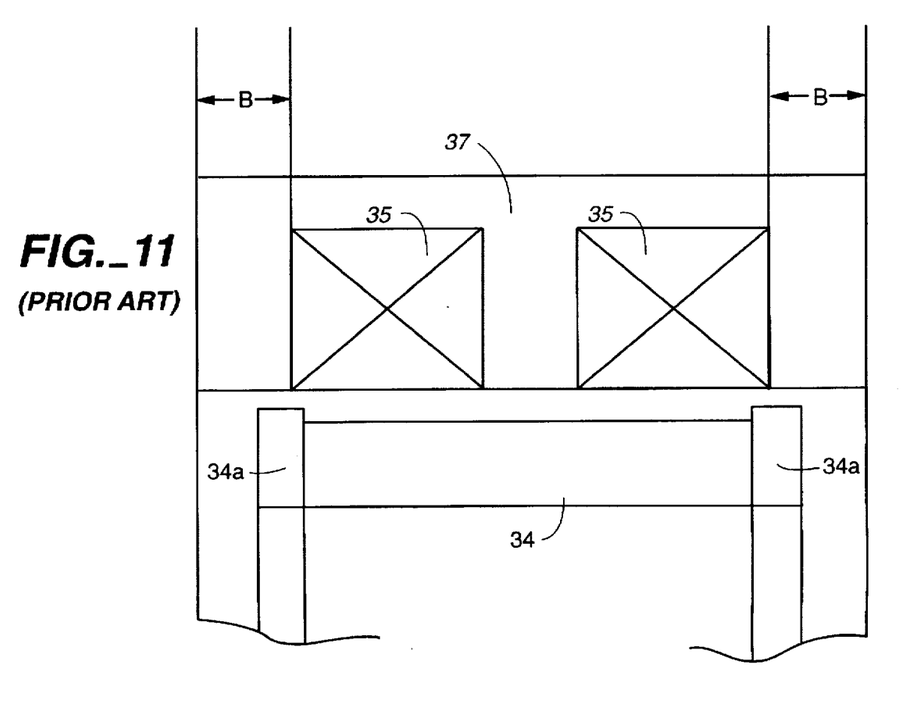
FIG. 11 is a cross-sectional view showing a clutch movable portion and a clutch driving portion in the prior art for comparison with the power transmitting unit of the second embodiment.
Figure 12:
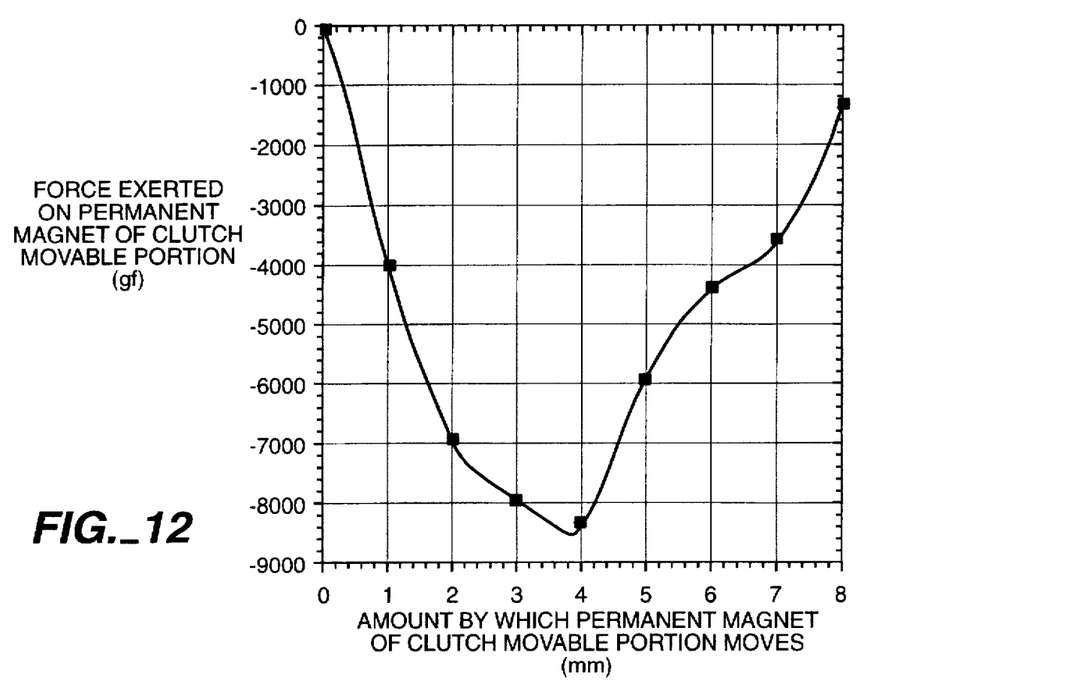
FIG. 12 is a graph for explaining forces acting on the electro-magnetically operated clutch movable portion in a conventional device.
Figure 13:
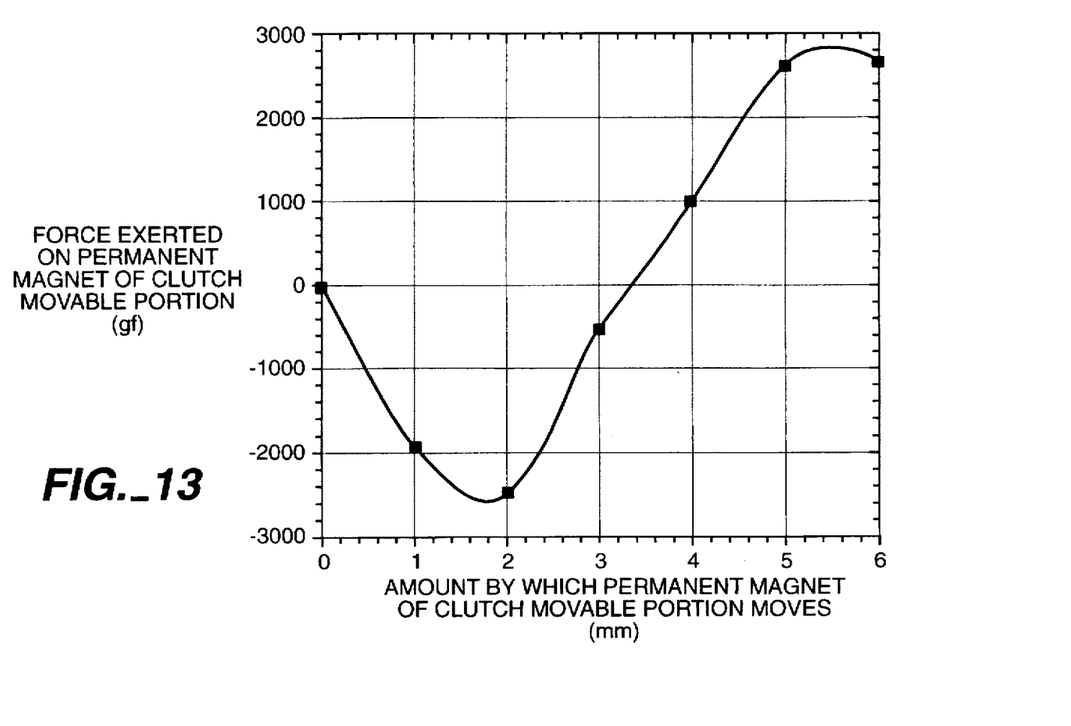
FIG. 13 is a graph for explaining forces acting on the electro-magnetically operated clutch movable portion in the second embodiment.

Further, as shown in FIG. 10, E-shaped yoke 36 is formed to have a larger yoke thickness at both axial ends than a conventional E-shaped yoke 37 (FIG. 11), so that a magnetic circuit having an increased amount of magnetic flux at each of both the yoke ends is constituted. Specifically, yoke thickness A at both the ends of present E-shaped yoke 36 is set to be greater than yoke thickness B at both the ends of conventional E-shaped yoke 37. When permanent magnet 34 is moved, a magnetic field generated by permanent magnet 34 causes forces, though varying in amount, to act on itself always in one direction against movement of the permanent magnet, as shown in FIG. 12, for conventional E-shaped yoke 37. On the other hand, for present E-shaped yoke 36 having both the thickened yoke ends, the direction in which forces are acting on permanent magnet 34 is reversed substantially at a midpoint of movement of permanent magnet 34, as shown in FIG. 13. Specifically, within a stroke of movement of permanent magnet 34 from the start point indicated by solid lines in FIG. 10 to the nearly midpoint indicated by broken lines, permanent magnet 34 is subjected to forces acting in opposed relation to the direction of movement thereof. However, within a stroke of movement of permanent magnet 34 from the nearly midpoint to the end point indicated by two-dot-chain lines, permanent magnet 34 is subjected to forces acting to propel it in the direction of movement.

Thus, when clutch movable portion 32 is positioned at end of its movement stroke, attraction forces are exerted on permanent magnet 34 by cooperation of permanent magnet 34 of clutch movable portion 32 and the yoke of clutch driving portion 33 so as to act always in the direction of causing clutch movable portion 32 to move into mesh with driver transmission gear 24 or 26. Therefore, when clutch movable portion 32 once reaches the stroke end, clutch movable portion 32 will not return to the neutral position and can be held in a pressed condition against the driver transmission gear even if excitation coils 35 of clutch driving portion 33 are not energized. Stated otherwise, since the direction in which the forces are acting on clutch movable portion 32 is reversed before reaching the opposite ends of movement stroke of clutch movable portion 32 such that forces pressing clutch movable portion 32 in the direction of movement under excitation continues acting even after excitation coils 35 are stopped from being not energized, it is just required to energize excitation coils 35 of clutch driving portion 33 only at the beginning of movement of clutch movable portion 32. As a result, the power consumed by the clutch operation can be reduced to a necessary minimum value.

When breaking the connection of the clutch, i.e., when returning clutch movable portion 32 of dog clutch 23 to the neutral position, or when connecting it to the gear on the opposite side, a current is supplied to excitation coils 35 in the reversed direction. Clutch movable portion 32 is thereby moved in a similar manner as mentioned above, but in the reversed direction.

First and second transmission gear trains 30 connected to or disconnected from dog clutch 23 comprise first and second driver transmission gears 24, 26 which are supported respectively on both sides of dog clutch 23 to be loosely rotatable over motor output shaft 7a, first and second driven transmission gears 25, 27 in mesh with driver transmission gears 24, 26, respectively, intermediate driver gear 28 fitted over intermediate driver shaft 28a to which first and second driven transmission gears 25, 27 are both fixed, and intermediate driven gear 29 in mesh with intermediate driver gear 28. The numbers of teeth of the first driver transmission gear and the first driven transmission gear are set to have a gear ratio of 30:1, for example, and the numbers of teeth of the second driver transmission gear and the second driven transmission gear are set to have a gear ratio of 10:1, for example. Thus, the rotational speed input from the motor output shaft is reduced at any one of such gear ratios.

The driving forces thus speed-reduced is finally transmitted to rear wheel 5 through toothed belt transmission device 31. Specifically, intermediate driven gear 29 is fixed to a pulley shaft 41a to which is fixed a driver pulley 41. A toothed belt 43 is extended between driver pulley 41 and a driven pulley 42 fixed to rear wheel axle 5a. Therefore, the driving forces are highly efficiently transmitted through meshing between respective teeth on pulleys 41, 42 and belt 43. In other words, the transmission through teeth meshing is free from slippage and, hence, can be achieved with high reliability and efficiency.

Operation of automatic multiple-speed clutch transmission thus constructed will be described below.

First, the control circuit automatically determines based on the running conditions and issues a clutch switching command to start the clutch switching operation of dog clutch 23.

When the electric motorcycle now starts traveling, for example, the clutch transmission is shifted from the second gear side so far selected for traveling to the first gear side. More specifically, a current in the predetermined clutch switching direction is supplied to excitation coils 35 of clutch driving portion 33, whereupon excitation coils 35 generates magnetic fields. These magnetic fields act on permanent magnet 34 of clutch movable portion 32, causing clutch movable portion 32 to move toward first driver transmission gear 24. At the same time, in response to a clutch switching signal, the torque and the rotational speed of the motor are controlled to be temporarily changed into proper ones, e.g., low torque. Accordingly, clutch movable portion 32 and first driver transmission gear 24 are smoothly engaged with each other, enabling first driver transmission gear 24 to be rotatively driven at the same rotational speed as motor output shaft 7a, and the energization of excitation coils 35 is stopped. Then, the rotational speed of the motor is reduced at the gear ratio of the first transmission gear train, and first driven transmission gear 25 is rotated at the reduced rotational speed. The resulting rotative driving forces are transmitted from intermediate driver gear 28 on the same shaft as first driven transmission gear 25 to driver pulley 41 through intermediate driven gear 29. Then, the rotative driving forces of driver pulley 41 are transmitted to driven pulley 42 through toothed belt 43, whereupon rear wheel 5 coupled to rear wheel axle 5a, to which driven pulley 41 is fixed, is driven at the reduced rotational speed determined by the first transmission gear ratio, thereby propelling the electric motorcycle to travel.

When the traveling speed is increased and the motor is operated at a high rotational seed and high torque after the electric motorcycle is driven at the first transmission speed, the clutch transmission is now shifted from the first gear side to the second gear side. More specifically, a current in the predetermined clutch switching direction is supplied to excitation coils 35 of clutch driving portion 33, whereupon excitation coils 35 generates magnetic fields. These magnetic fields act on permanent magnet 34 of clutch movable portion 32, causing clutch movable portion 32 to move toward second driver transmission gear 26. At the same time, in response to a clutch switching signal, the torque and the rotational speed of the motor are controlled to be temporarily changed into proper ones. Accordingly, clutch movable portion 32 and second driver transmission gear 26 are smoothly engaged with each other, enabling second driver transmission gear 26 to be rotatively driven at the same rotational speed as motor output shaft 7a, and the energization of excitation coils 35 is stopped. Then, the rotational speed of the motor is reduced at the gear ratio of the second transmission gear train, and second driven transmission gear 27 is rotated at the reduced rotational speed, thereby propelling the electric motorcycle to continue traveling.

With this embodiment, as explained above, since the driver side and the driven side are coupled to each other through mechanical meshing using the dog clutch as one type of meshing clutches operated by electromagnetic forces, and driving forces are transmitted through meshing between respective teeth on the belt and the pulleys, high transmission efficiency can be achieved. Specifically, since the combination of the meshing clutch and the toothed belt is free from slippage and ensures positive transmission of the driving forces, the transmission efficiency can be improved to about 90% in comparison with 70% achievable with the conventional friction transmission using a V belt. This is because utilization of friction forces produced between the belt and the pulleys for transmitting the driving forces therebetween necessarily causes a slippage during the transmission to such an extent that no appreciable problems occur in practical use, whereas no slippage is caused in the meshing transmission of this embodiment.

Also, since the make- and break-operation of the clutch is electrically performed by utilizing electromagnetic forces, the clutch can be actuated in electrical interlock with the motor to improve performance of the clutch operation. Specifically, when the clutch is actuated for the make- and break-operation, the torque and the rotational speed of the motor can be controlled to be temporarily changed into proper ones in response to the clutch switching signal. Therefore, meshing, engagement and disengagement between the clutch members can smoothly be effected, providing an agreeable feeling in the clutch operation and improving performance of the make- and break-operation of the clutch.

Further, since the motor driving circuit, the motor for driving, and the automatic multiple-speed clutch transmission are housed as one unit in the enclosed case provided with the heat radiating plates, the case can serve as a casing while ensuring heat radiation, resulting in the simplified structure.

Additionally, since the electric wiring interconnecting the above components are housed in the case, the wiring can be protected sufficiently and reliability of the power and transmitting apparatus can be increased.

As described hereinabove, according to the electric power unit of the first aspect of the present invention, since the battery power supply comprising the plurality of storage cells, the charger, and the motor driving circuit are mounted in and on the case, and the connectors of those components are coupled by the sockets to interconnect the components without using cables, the drawbacks attributable to the cable connection can be solved totally. It is thus possible to prevent troubles caused by disconnection of the connecting cables and contact failures of the connectors. Also, since the storage cells can be interconnected in series or so in a predetermined way just by mounting the plate substrate in place, troublesome operation of attaching the connecting cables of the storage cells one by one is eliminated.

When replacing the exhausted battery in usual case, it is just required to replace the electric power unit having a reduced battery capacity by another fully charged electric power unit at a time. Accordingly, there is no need of detaching and attaching the connecting cables whenever each storage cell is unloaded and loaded.

Further, when replacing the battery after the electric vehicle has continued traveling, the motor driving circuit which may fail to operate due to the heat generated by continuous operation can also be replaced by new one under the normal temperature at the same time, enabling the electric vehicle to have a further traveling distance than is conventionally possible.

When the electric power unit is thus replaced together, performance of the storage cells can be maintained at a satisfactory level and the cell life can be drastically prolonged by charging the exhausted electric power unit under strict temperature control. Specifically, when a storage cell is charged in a conventional manner, it cannot be charged at a desired constant temperature because the temperature of the storage cell itself is raised during the charging, or the temperature of open air is varied depending on the season. On the other hand, by charging the electric power unit of the present invention while it is entirely immersed in a constant-temperature water bath at 30° C., for example, the electric power unit can be charged while keeping it in a proper temperature condition. It is thus possible to prevent a reduction in reliability of the storage cells due to temperature variations, maintain performance of the storage cells at a satisfactory level, and hence prolong the cell life.

According to the second aspect of the present invention, since the case is made of a material having good thermal conductivity, the charger and the motor driving circuit are mounted on the case, and the heat radiating plates are provided near the mounted positions of those components, heat radiation is accelerated and a great heat radiating effect is provided.

Additionally, when the motor driving circuit and the charger are mounted in the vicinity of the battery power supply, the heat generated upon operation of the motor driving circuit or the charger can be conducted to the side of the storage cells through the case having high thermal conductivity in environment under low temperatures such as encountered in the winter, enabling the storage cells of the battery power supply to be heated appropriately and kept at a proper temperature. Even in low-temperature environment, therefore, a deterioration in performance of the storage cells is prevented.

According to the third aspect of the present invention, since the make- and break-operation of the clutch is electrically performed by utilizing electromagnetic forces, the clutch can be actuated in electrical interlock with the motor to improve performance of the clutch operation. That is to say, when the clutch is actuated for the make- and break-operation, the torque and the rotational speed of the motor can be controlled to be temporarily changed into proper ones in response to the clutch switching signal.

According to the fourth aspect of the present invention, when the clutch movable portion is positioned at the end of its movement stroke, attraction forces are exerted on the permanent magnet by cooperation of the permanent magnet of the clutch movable portion and the yoke of the clutch driving portion so as to act always in the direction of causing the clutch movable portion to move into mesh with the driver transmission gear. Therefore, when the clutch movable portion once reaches the stroke end, the clutch movable portion will not return to the neutral position and can be held in a pressed condition against the driver transmission gear even if the excitation coils of the clutch driving portion are not energized. Stated otherwise, since the direction in which electromagnetic forces are acting on the clutch movable portion is reversed before reaching the opposite ends of movement stroke of the clutch movable portion such that the forces pressing the clutch movable portion in the direction of movement under excitation continues acting even after the excitation coils are stopped from being energized, it is just required to energize the excitation coils of the clutch driving portion only at the beginning of movement of the clutch movable portion. As a result, the power consumed by the clutch operation can be reduced to a necessary minimum value. When breaking the connection of the clutch, i.e., when returning the clutch movable portion of the dog clutch to the neutral position, or when connecting it to the gear on the opposite side, a current is supplied to the excitation coils in the reversed direction. The clutch movable portion is thereby moved in a similar manner as mentioned above, but in the reversed direction.

In the third and fourth aspects of the present invention, when the automatic multiple-speed clutch transmission is housed in the enclosed case provided with the heat radiating plates, the case can serve as a casing while ensuring efficient heat radiation, resulting in the simplified structure.

According to the present invention, as set forth above, the electric power unit which can be assembled easily and replaced by new one at a time is provided by housing the plurality of storage cells, the motor driving circuit and the charger in the case, and electrically connecting those components to each other by the plate substrate. Also, the power transmitting unit which can increase the transmission efficiency and can be automatically operated in electrical interlock with the motor is provided by using the motor for traveling and the automatic multiple-speed clutch transmission provided with the meshing clutch operable by electromagnetic forces. Thus, by realizing the unit structure of each of the electric power unit and the power transmitting unit, the present invention can improve the overall traveling ability of electric vehicles.

While the invention has been described in conjunction with several specific embodiments, it is evident to those skilled in the art that may further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A power transmitting unit for an electric vehicle including a motor, a clutch, a transmission and a power transmitting mechanism, said power transmitting unit comprising:

a dog clutch arranged to be rotatable with an output shaft of said motor and movable in a coaxial direction, and an automatic multiple-speed clutch transmission comprising a plurality of gear trains including first and second transmission gears which are supported respectively on both sides of said dog clutch to be loosely rotatable and whereby said dog clutch is mechanically brought into contact with or away from said first and second transmission gears, wherein said dog clutch comprises a clutch movable portion movable in an axial direction of the output shaft and movable between said first transmission gear and said second transmission gear, a permanent magnet, a clutch driving portion disposed around said clutch movable portion and an excitation coil having, at each end of said clutch driving portion, a first thickness in said axial direction of the output shaft, wherein said clutch movable portion has, at each end, a yoke having a second thickness in said axial direction of the output shaft, wherein said clutch driving portion has, at each end, a yoke having a third thickness in said axial direction of the output shaft larger than said second thickness, and larger than a total thickness of half of said first thickness plus half of said second thickness for forming a magnetic circuit, whereby within a first stroke of movement of said clutch movable portion from a start point near an inside diameter of one of said clutch driving portion yokes to a nearly midpoint between said start point and an end point near an outside diameter of said one clutch driving portion yoke along an axial direction of the output shaft, said magnetic circuit induces electromagnetic forces acting in opposed relation to the direction of movement of said clutch movable portion, and within said first stroke of movement of said clutch movable portion from said midpoint to said end point, said magnetic circuit induces electromagnetic forces acting to propel said clutch movable portion in the direction of movement.

2. A power transmitting unit according to claim 1, further comprising a case for housing said automatic multiple-speed clutch transmission.

\* \* \* \* \*

UNITED STATES PATENT AND TRADEMARK OFFICE
CERTIFICATE OF CORRECTION

PATENT NO. : 5,765,671
DATED : June 16, 1998
INVENTOR(S) : Ken-Ichi Endo, et al.

It is certified that error appears in the above-identified patent and that said Letters Patent is hereby corrected as shown below:

Title page, item 73, Assignee, insert --Tokyo R&D Co. Ltd., both of-- after "Seiko Epson Corporation,".

Signed and Sealed this

Fifteenth Day of June, 1999

Attest:

Q. TODD DICKINSON

Attesting Officer

Acting Commissioner of Patents and Trademarks